United States Patent [19]
Hacker

[11] 3,782,208
[45] Jan. 1, 1974

[54] INTERMITTENT DRIVE

[76] Inventor: Earl Hacker, Rt. 1, Long Branch Rd., Beattyville, Ky.

[22] Filed: Sept. 24, 1971

[21] Appl. No.: 183,453

[52] U.S. Cl............................ 74/112, 74/436, 4/217 C
[51] Int. Cl............................................. F16h 27/00
[58] Field of Search................ 74/112, 216.5, 220, 74/436, 125.5, 217 C

[56] References Cited
UNITED STATES PATENTS

| 157,722 | 12/1874 | Paine | 74/436 |
| 1,166,120 | 12/1915 | Fox | 74/436 |
| 1,167,854 | 1/1916 | Stineman et al. | 74/436 |
| 1,396,002 | 11/1921 | Bianchi | 74/436 |
| 1,873,007 | 8/1932 | Meyer | 74/217 C |
| 2,560,754 | 7/1951 | Weyant | 74/125.5 |
| 460,994 | 10/1891 | Scott | 74/220 |
| 954,789 | 4/1910 | Edison | 74/216.5 |
| 2,757,569 | 8/1956 | Isom | 74/112 |

Primary Examiner—Charles J. Myhre
Assistant Examiner—Wesley S. Ratliff, Jr.

[57] ABSTRACT

A chain and sprocket drive for transposing rotary motion to intermittent rotary motion. The drive interconnects two shafts, one of which is an input shaft and has two drive sprockets keyed thereto and the other of which is an output shaft and has three sprockets mounted thereon. The outer two of the three sprockets are idler sprockets driven from the two drive sprockets on the input shaft. The inner or central sprocket of the three sprockets is keyed to the output shaft and is intermittently driven by a link connected between the two endless chains.

12 Claims, 1 Drawing Figure

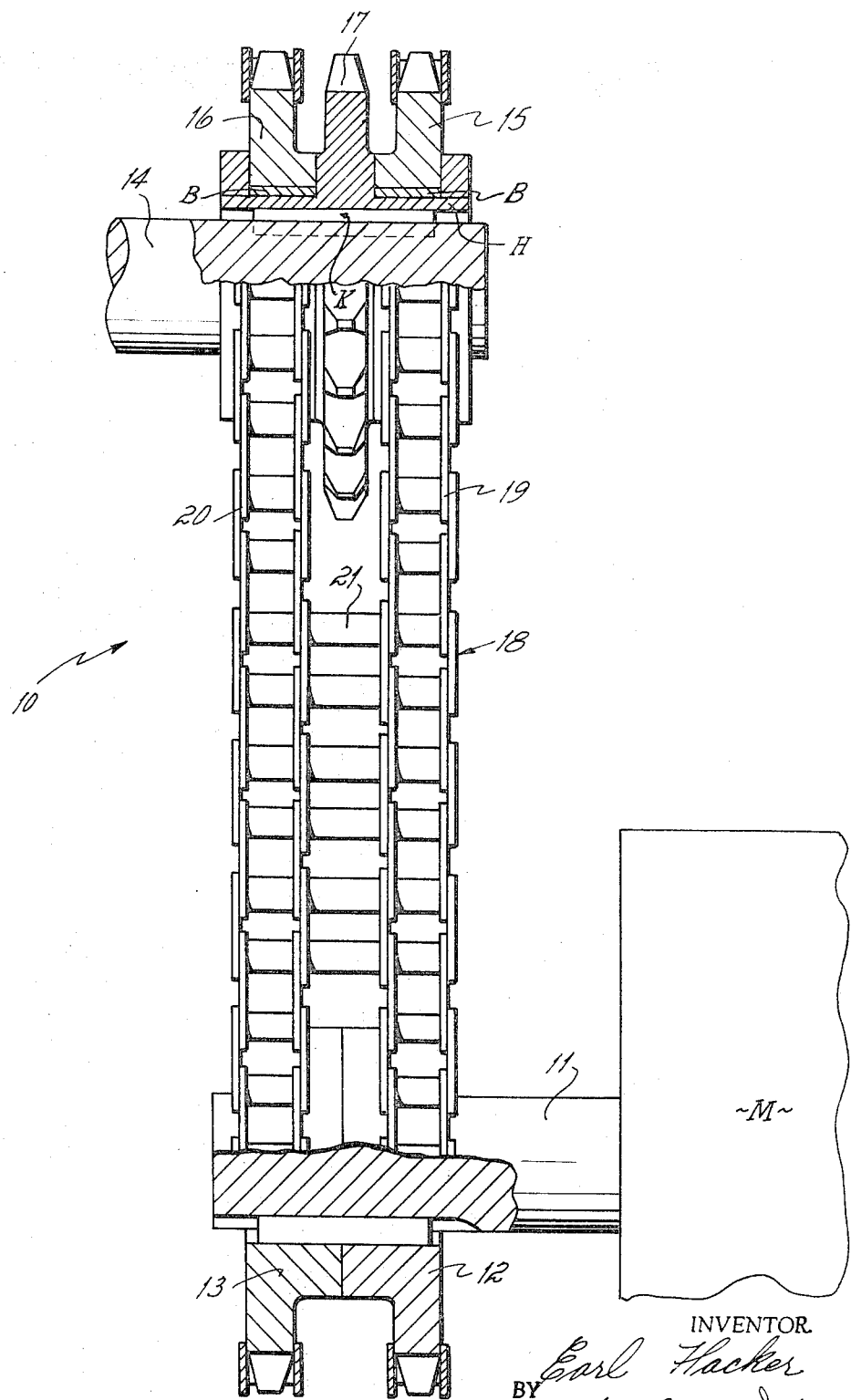

INTERMITTENT DRIVE

This invention relates generally to a motion transmission apparatus and particularly to apparatus for converting rotary motion to intermittent rotary motion.

Heretofore, apparatus for supplying intermittent rotary motion to a variety of machine elements such as conveyors or feed screws, for instance, or to any other device requiring such motion, has been relatively expensive and complex. Devices such as clutches, geneva drives, and electronic oscillatory solenoids, for instance, have been utilized. These devices generally include a large number of parts, all subject to wear or malfunction, and generally require skilled in maintenance service.

One objective of my invention has been to provide a simple yet efficient apparatus of relatively few parts for transposing rotary motion to intermittent rotary motion. The invention may be utilized with any type of primary rotary motion to produce a resultant intermittent rotary motion.

A further objective of my invention has been to provide a simple yet efficient apparatus for transposing rotary motion to intermittent rotary motion in an infinite number of possible drive ratios.

A further and related objective of my invention has been to provide a rotary to intermittent rotary drive which is adapted to interconnect shafts which are not precisely located with respect both to the distance between them and to variations in their parallel disposition.

Briefly, the drive apparatus which accomplishes these objectives is based on my concept of providing a chain or belt driving connection between a rotatable input shaft and a rotatable output shaft, which connection is continuously driven between the shafts but only intermittenly engages and drives the output shaft.

The preferred embodiment of the apparatus for accomplishing these objectives includes two driven sprockets which are secured to the input shaft and which are operable to drive, through a pair of parallel chain drives, a pair of free-wheeling idler sprockets rotatably mounted upon the output shaft. When rotary motion is applied to the input shaft, the two driving sprockets drive the chains which in turn drive the free-wheeling idler sprockets on the output shaft. Since the idler sprockets are free to rotate about the output shaft, the output shaft is not driven by the idlers. A chain link extends between the two drives, however, and intermittently engages a central keyed sprocket on the output shaft between the two idler sprockets. Thus the rotary motion imparted to the input shaft is transposed into intermittent rotary motion of the output shaft via the connecting link and the third sprocket on the output shaft.

The number of central chain links, the spacing between the links, and the shape or configuration of the connecting links as well as the distance between the driving and driven shafts may be varied to accomplish variations or adjustments in the intermittent rotary output of the apparatus.

One advantage of my invention is that it provides a simple apparatus of relatively few moving parts for transmitting rotary motion into intermittent rotary motion.

A further advantage of my invention is that it provides apparatus for transmitting rotary motion into intermittent rotary motion, the apparatus being adaptable to a variety of conveyor, feed screw, and other rotatable machinery applications.

A yet further advantage of my invention is that the elements of the apparatus are readily changeable or variable in order to provide variations in the nature and ratio of the intermittent rotary output.

A still further advantage of my invention is that it can be utilized to effect an intermittent rotational drive between two shafts without the necessity of precise spacing between the shafts or of precise parallel positioning of the shafts.

Furthermore, expensive bearings and shafts are not required in my apparatus since it readily accommodates any eccentricities in either of these elements.

These and other objects and advantages will become readily apparent from the following detailed description and drawing in which:

The FIGURE is a plan view of the input shaft, output shaft, sprockets, and triple chain, a portion of the shafts and sprockets being broken away to show the mounting details.

Referring to the drawing, there is shown the intermittent rotary drive apparatus designated generally at 10. It includes an input shaft 11 to which is secured two driving sprockets 12 and 13. Sprockets 12 and 13 are secured against rotation with respect to shaft 11 by any well known means such as a shear key K and an associated keyway, for instance. Thus sprockets 12 and 13 are rotationally driven when shaft 11 is rotated by any power source such as a motor M or by any rotational driving elements.

An output shaft 14 is rotationally mounted with its longitudinal axis generally parallel to that of shaft 11.

Three sprockets 15, 16 and 17 are mounted on the shaft 14. The sprocket 17 includes a double hub H which is machined to accept on either side of sprocket 17 and idler sprocket 15 and 16, respectively. The hub H is keyed to the output shaft 14, thereby securing the sprocket 17 to the shaft. Sprockets 15 and 16, however, are rotationally mounted by way of appropriate bearings B on each side of sprocket 17 and on the hub H so that they are free to rotate with respect to shaft 14 as well as with respect to hub H. Collars may be used on the respective ends of hub H to secure sprockets 15 and 16 against axial movement.

A flexible chain drive means 18 is utilized to connect sprockets 12 and 13 with sprockets 15 and 16, respectively and to impart motion to sprocket 17. The chain drive means 18 generally comprises two flexible endless chains 19 and 20 which connect sprockets 12 and 15 and sprockets 13 and 16, respectively.

Chain drive links 20 are connected between chains 19 and 20, thereby forming the complete chain drive means 18. It will be understood that, while only one flexible chain drive portion of six links 21 is shown for clarity, a pluraltiy of portions or of links 21 could be intermittently connected between chains 19 and 20. Each portion may be of the same length or of varied lengths (i.e. number of links), as will be discussed.

The apparatus operates in the following manner. Input shaft 11 is rotationally driven by motor M or any other device to rotate driving sprockets 12 and 13. Sprockets 12 and 13 in turn drive chains 19 and 20, respectively. These chains drive sprockets 15 and 16, but no motion is imparted to output shaft 14 since sprockets 15 and 16 are free to rotate on hub H.

Chains 19 and 20 carry one or more chain links 21 and, when a link 21 is carried about and engages sprocket 17, this sprocket is driven. Since sprocket 17 is securely fastened to output shaft 14 through hub H, the shaft is rotated. Of course shaft 14 is connected to impart rotary motion to an element to be driven. When all chain links 21 are disengaged from sprocket 17, the sprocket 17 is disengaged from any driving force and shaft 14 is not driven.

The operation may be continued with shaft 11 being rotationally driven and with shaft 14 being intermittently rotated during engagements of chain links 21 with sprocket 17. Thus rotary motion is simply and expeditiously transmitted into intermittent rotary motion.

It will be appreciated that the number of chain links 21 or of portions made up of a plurality of links may be varied in order to vary the frequency of rotational movements imparted to shaft 14 during a complete cycle of chains 19 and 20. In addition, the length of the chain portions, comprising a number of links 21, may be varied to vary the duration of each rotational movement imparted to shaft 14 during a cycle of chains 19 and 20. A plurality of chain drives 18, each with various numbers and lengths of chain portions, could be provided with each device for simple field installation, where various results are desired.

It will also be appreciated that the distance between shafts 11 and 14 may be varied so as to allow a greater number of chain portions to be used between chains 19 and 20 and thereby impart a greater frequency of movements to shaft 14 for each cycle of chains 19 and 20. Also, the distance between the input and output shafts is not critical and an infinite number of variations can be accommodated by my invention, unlike gear driven apparatus wherein preciseness is required in the exact positioning of the gears.

The speed of the motor M may be varied in any known manner to indirectly control the speed of shaft 14 during its intermittent movements.

Additionally, the size of sprockets 12, 13 and 15–17 may be varied to effect in a well known manner to obtain desired speed variations or driven ratios within the apparatus.

It will be noted that, since a flexible drive is utilized between the input and output shafts, exact shaft parallelism is not required, the flexibility of the drive accommodating misalignments.

Other embodiments of my invention may be used as well. By way of example, these may include apparatus comprising only one driving sprocket on the input shaft and only one free-wheeling idler sprocket on the output shaft. A single chain drive includes laterally extending drive links, intermittently positioned thereon, to engage and drive a driven sprocket secured to the output shaft in order to drive it.

Alternately, gears and appropriate endless belts with connected intermittent belts may be substituted for the sprockets and chain drive of the preferred embodiment.

In yet another example, one driving gear is utilized on the input shaft and one free-wheeling idler gear is rotatably mounted on the output shaft. A driven gear is drivingly secured to the output shaft adjacent the idler gear and may be a typical bevel gear or have teeth otherwise placed on its side about its circumference. A belt connects the driving gear and the idler gear and includes drive teeth intermittently located on its side in order to intermittently engage and drive the driven gear and thereby the output shaft.

All of these embodiments are susceptible of the variations mentioned with respect to the preferred embodiment. The distance between the shafts or their parallelism is not critical. The sizes of the pulleys or gears or length or number of the intermittent belt portions or teeth on the endless belt may be varied to attain variations in the nature and ratio of the intermittent rotary output as stated with regard to the preferred embodiment.

Thus I have provided a unique apparatus for transmitting rotary motion to intermittent rotary motion and which is susceptible of many variations to accomplish a plurality of desired results. While I have described in detail a preferred embodiment and several alternate embodiments of my invention, other variations and modifications will become readily apparent to one of ordinary skill in the art and I intend to be bound only by the appended claims.

I claim:

1. Apparatus for transmitting rotary motion into intermittent rotary motion comprising:
   a rotatable input shaft,
   a rotatable output shaft generally parallel to said input shaft,
   a plurality of first rotatable means secured to said input shaft,
   a plurality of second rotatable means rotatably mounted on said output shaft,
   third rotatable means secured to said output shaft,
   a plurality of first flexible drive means connecting said first and second rotatable means, respectively, and
   second flexible drive means connected between said first flexible means for intermittently engaging and driving said third rotatable means and thereby said output shaft.

2. Apparatus as in claim 1 wherein said first, second and third rotatable means are sprockets.

3. Apparatus as in claim 2 wherein said first flexible means comprises two endless chains and wherein said second flexible means for intermittently engaging said third rotatable means comprises at least one additional chain portion disposed between the two endless chains and connected thereto to effect an integral triple chain.

4. Apparatus as in claim 2 wherein said first flexible means comprises two endless chains and wherein said second flexible means for intermittently engaging said third rotatable means comprises a plurality of chain portion means disposed at intervals between the two endless chains and connected thereto for intermittently engaging and driving said third rotatable means.

5. Apparatus for transmitting rotary motion into intermittent rotary motion comprising:
   an input shaft,
   two driving sprockets secured to said input shaft,
   an output shaft generally parallel to said input shaft,
   two idler sprockets rotatably mounted on said output shaft,
   a third sprocket secured to said output shaft between said idler sprockets,
   a plurality of first flexible means connecting said driving sprockets and said idler sprockets respectively, and second flexible means connected between said first flexible means to intermittently engage and drive said third sprocket.

6. Apparatus as in claim 5 wherein said first flexible means comprise two endless chains and said second flexible means comprises at least one additional chain portion connected between the two endless chains.

7. Apparatus as in claim 5 wherein said first flexible means comprises two endless chains and said second flexible means comprises additional chain portions connected at intervals between the two endless chains.

8. Apparatus as in claim 5 wherein said third sprocket secured to said output shaft includes a hub means which is provided with means for securing said hub and sprocket to said output shaft and wherein said idler sprockets are mounted for rotation on said hub means.

9. Apparatus for transmitting rotary motion into intermittent rotary motion comprising:
an input shaft,
two driving sprockets secured to said input shaft,
an output shaft generally parallel to said input shaft,
two idler sprockets rotatably mounted on said output shaft,
a third sprocket secured to said output shaft between said idler sprockets,
a pair of first flexible chains connecting each of said driving sprockets with one of said idler sprockets respectively, and
means connected between said chains to intermittently engage and drive said third sprocket.

10. Apparatus for transmitting rotary motion into intermittent rotary motion comprising:
an input shaft,
at least one driving sprocket secured to said input shaft,
an output shaft parallel to said input shaft,
at least one idler sprocket rotatably mounted on said output shaft,
a driven sprocket secured to said output shaft adjacent said idler sprocket,
a flexible chain means for operatively connecting said driving sprocket to said idler sprocket, and
means disposed on said chain for intermittently engaging and driving said driven sprocket.

11. Apparatus for transmitting rotary motion into intermittent rotary motion comprising:
a rotatable input shaft,
a rotatable output shaft generally parallel to said input shaft,
first rotatable means secured to said input shaft,
second rotatable means rotatably mounted on said output shaft,
third rotatable means secured to said output shaft,
first drive means connecting said first and second rotatable means, and
second drive means on said first drive means for intermittently engaging and driving said third rotatable means and thereby said output shaft.

12. Apparatus for transmitting rotary motion into intermittent rotary motion comprising,
a rotatable input shaft,
a rotatable output shaft,
rotatable means mounted on each of said shafts, one of said rotatable means being rigidly secured to said output shaft,
flexible means for connecting said rotatable means, and
means carried by said flexible means for intermittently engaging and driving said rigidly secured rotatable means and thereby said output shaft.

* * * * *

UNITED STATES PATENT OFFICE
CERTIFICATE OF CORRECTION

Patent No. 3,782,208                    Dated January 1, 1974

Inventor(s)   Earl Hacker

It is certified that error appears in the above-identified patent and that said Letters Patent are hereby corrected as shown below:

On the face of the patent, after "Assistant Examiner — Wesley S. Ratliff, Jr." please insert --Attorney, Agent, or Firm — Wood, Herron & Evans--

Signed and sealed this 23rd day of July 1974.

(SEAL)
Attest:

McCOY M. GIBSON, JR.
Attesting Officer

C. MARSHALL DANN
Commissioner of Patents